United States Patent Office 3,290,314
Patented Dec. 6, 1966

3,290,314
(±)-8-AZAOESTR-OR-8-AZAGONA-4-EN-17β-OL-3-ONES
Richard Clarkson, Macclesfield, England, assignor to Imperial Chemical Industries Limited, London, England, a corporation of Great Britain
No Drawing. Filed Apr. 21, 1964, Ser. No. 361,535
Claims priority, application Great Britain, May 10, 1963, 18,625/63
4 Claims. (Cl. 260—286)

This invention relates to heterocyclic ketones which possess therapeutic properties.

According to the invention we provide heterocyclic ketones of the formula:

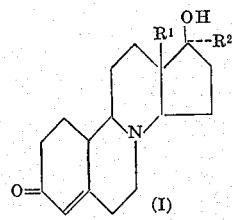

wherein $R^1$ stands for a lower alkyl radical and $R^2$ stands for hydrogen or a lower alkyl, lower alkenyl or lower alkynyl radical, and the salts thereof.

As one embodiment of the invention there may be mentioned, for example, those of the said heterocyclic ketones which have the gonane configuration. It is to be understood that in this specification expressions such as "lower alkyl radical" or "lower alkenyl radical," etc., mean alkyl or alkenyl radicals, respectively, of not more than 6 carbon atoms. It is also to be understood that unqualified expressions such as "alkyl radical" or "aralkyl radical" only encompass unsubstituted alkyl or aralkyl radicals respectively.

As a suitable value for $R^1$, or for $R^2$ when it stands for a lower alkyl radical, there may be mentioned, for example, the methyl, ethyl or n-propyl radical. As a suitable value for $R^2$ when it stands for a lower alkenyl or alkynyl radical there may be mentioned, for example, the vinyl, allyl or ethynyl radical.

Specific heterocyclic ketones of the invention are, for example, (±)-8-azaoestr-en-17β-ol-one,
(±)-17α-methyl-8-azaoestr-4-en-17β-ol-3-one,
(±)-17α-ethyl-8-azaoestr-4-en-17β-ol-3-one,
(±)-17α-ethynyl-8-azaoestr-4-en-17β-ol-3-one,
(±)-17α-allyl-8-azaoestr-4-en-17β-ol-3-one,
(±)-17α-vinyl-8-azaoestr-4-en-17β-ol-3-one,
(±)-13-ethyl-8-azagona-4-en-17β-ol-3-one,
(±)-13,17α-diethyl-8-azagona-4-en-17β-ol-3-one,
(±)-13-ethyl-17α-ethynyl-8-azagona-4-en-17β-ol-3-one,
(±)-13-n-propyl-8-azagona-4-en-17β-ol-3-one
(±)-17α-ethyl-13-n-propyl-8-azagona-4-en-17β-ol-3-one, and
(±)-17α-ethynyl-13-n-propyl-8-azagona-4-en-17β-ol-3-one and the salts thereof.

As suitable salts of the heterocyclic ketones of the invention there may be mentioned, for example, acid-addition salts, for example salts derived from inorganic acids, for example hydrochloric acid, or from organic acids, for example oxalic acid.

According to a further feature of the invention we provide a process for the manufacture of the heterocyclic ketones and the salts thereof of the invention which comprises the interaction of a compound of the formula:

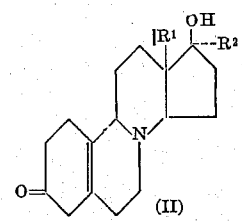

wherein $R^1$ and $R^2$ have the meanings stated above, with a base.

As suitable bases there may be mentioned, for example, an alkali metal hydroxide, for example sodium hydroxide, or an alkali metal lower alkoxide, for example sodium methoxide or potassium t-butoxide, or a tertiary organic base, for example pyridine.

The interaction may be carried out in a diluent or solvent, for example aqueous methanol, at a temperature between 10° C. and 60° C., for example at ambient temperature, and in an inert atmosphere, for example an atmosphere of nitrogen.

The starting materials of the Formula II may be obtained by the hydrolysis of compounds of the formula:

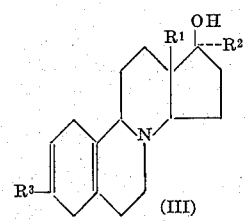

wherein $R^1$ and $R^2$ have the meanings stated above, and $R^3$ stands for an alkoxy or aralkoxy radical, as described in U.S. application Serial No. 361,554, filed April 21, 1964.

According to a further feature of the invention we provide a process for the manufacture of those of the heterocyclic ketones and the salts thereof of the invention wherein $R^2$ stands for a lower alkenyl radical, which comprises the reduction of a compound of the formula:

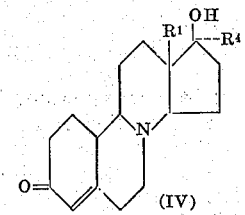

wherein $R^1$ has the meaning stated above, and $R^4$ stands for a lower alkynyl radical, or a salt thereof, such that the lower alkynyl radical is reduced to the corresponding lower alkenyl radical.

As a suitable value for $R^4$ there may be mentioned, for example, the ethynyl radical.

The reduction may be effected by catalytic hydrogenation, for example hydrogenation in the presence of palladium on calcium carbonate, optionally in the presence of a catalyst poison, for example pyridine.

The heterocyclic ketones and the salts thereof of this invention possess progestational, androgenic and anabolic properties.

According to a further feature of the invention, therefore, we provide pharmaceutical compositions comprising one or more compounds of the Formula I or a salt or salts thereof an a pharmaceutically-acceptable diluent or carrier therefor.

The pharmaceutical compositions of the invention may be in the form of tablets, capsules, aqueous or oily solutions, aqueous or oily suspensions, emulsions, sterile injectable aqueous or oily solutions or suspensions, or dispersible powders.

Suitable tablets may be formulated by admixture of the active ingredient(s) with known pharmaceutical excipients, for example inert diluents, for example calcium carbonate, calcium phosphate, lactose or mannitol, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose or sucrose, and a flavouring agent, for example vanillin or orange extract, in order to provide a palatable product. The aqueous suspensions of the invention may also contain suspending or thickening agents, for example sodium carboxymethylcellulose, wetting agents, for example condensation products of fatty alcohols with ethylene oxide, and preservatives, for example methyl or propyl p-hydroxybenzoate.

The emulsions of the invention may contain the active ingredient(s) dissolved in an oil of vegetable or animal origin, for example arachis oil or cod liver oil, and may also contain sweetening agents and flavouring agents which may with advantage be essential oils. The said emulsions may also contain emulsifying agents and dispersing agents, for example soya bean lecithin, polyoxyethylene sorbitan mono-oleate, gum acacia, gum tragacanth or casein, and preservatives, for example methyl or propyl p-hydroxybenzoate, and anti-oxidants, for example propyl gallate.

The oily solutions of the invention likewise may contain the active ingredient(s) in solution in an oil of vegetable or animal origin, and may optionally contain flavouring agents to mask the taste and improve oral acceptability. Such oily solutions may advantageously be filled into soft gelatin capsules. The oily solutions may also contain sweetening agents, for example icing sugar, in which case the oil phase may in addition contain a suspending agent, for example beeswax, to maintain the redispersion properties of the suspension.

Oral compositions in the form of gelatin capsules may consist of capsules containing active ingredient(s) only or the capsules may contain the active ingredient(s) in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenol-polyethylene oxide condensate, for example the condensation product of octyl cresol with about 8–10 molecular proportions of ethylene oxide. The sterile injectable oily solutions of the invention may be prepared from a non-toxic injectable oil, for example arachis oil or ethyl oleate, and they may additionally contain gelling agents, for example aluminum stearate, to delay absorption within the body. These aqueous and oily injectable preparations may contain preservatives such as methyl or n-propyl p-hydroxybenzoate or chlorobutanol.

The pharmaceutical compositions of the invention may optionally additionally contain one or more known medicinal steroids.

The invention is illustrated but not limited by the following examples in which the parts are by weight:

Example 1

A solution of 0.232 part of $(\pm)$-8-azaoestr-5(10)-en-17β-ol-3-one (M.P. 161–165° C.; prepared as described in Example 1 of the aforementioned U.S. application Serial No. 361,554) in 10 parts of methanol and 2 parts of 2 N-sodium hydroxide solution and under an atmosphere of nitrogen is kept at ambient temperature for 30 minutes. The methanol is then evaporated under reduced pressure, and the aqueous residue is extracted twice, each time with 20 parts of chloroform. The combined extracts are washed with 10 parts of water, and the solvent is evaporated under reduced pressure. The residue is crystallised from a mixture of benzene and petroleum ether (B.P. 60–80° C.) and there is thus obtained $(\pm)$-8-azaoestr-4-en-17β-ol-3-one, M.P. 119–121° C.

Example 2

The process described in Example 1 is repeated except that the $(\pm)$-8-azaoestr-5(10)-en-17β-ol-3-one is replaced by the same weight of $(\pm)$-17α-methyl-8-azaoestr-5(10)-en-17β-ol-3-one (M.P. 132–136° C.; obtained as described in Example 4 of the aforementioned U.S. application Serial No. 361,554). There is thus obtained $(\pm)$-17α-methyl-8-azaoestr-4-en-17β-ol-3-one, M.P. 155–158° C.

Example 3

The process described in Example 1 is repeated except that the $(\pm)$-8-azaoestr-5(10)-en-17β-ol-3-one is replaced by the same weight of $(\pm)$-17α-ethyl-8-azaoestr-5(10)-en-17β-ol-3-one (M.P. 165–174° C.; obtained as described in Example 2 of said U.S. application Serial No. 361,554). There is thus obtained $(\pm)$-17α-ethyl-8-azaoestr-4-en-17β-ol-3-one, M.P. 155–159° C.

Example 4

The process described in Example 1 is repeated except that the $(\pm)$-8-azaoestr-5(10)-en-17β-ol-3-one is replaced by the same weight of $(\pm)$-17α-ethynyl-8-azaoestr-5(10)-en-17β-ol-3-one (M.P. 175–182° C.; obtained as described in Example 3 of said U.S. application Serial No. 361,554). There is thus obtained $(\pm)$-17α-ethynyl-8-azaoestr-4-en-17β-ol-3-one, M.P. 197–199° C. [crystallised from a mixture of ethyl acetate and petroleum ether (B.P. 80–100° C.)].

Example 5

The process described in Example 1 is repeated except that the $(\pm)$-8-azaoestr-5(10)-en-17β-ol-3-one is replaced by the same weight of $(\pm)$-17α-allyl-8-azaoestr-5(10)-en-17β-ol-3-one (characterised by an infra-red absorption band at 1710 cm.$^{-1}$; obtained as described in Example 5 in the specification of said U.S. application Serial No. 361,554). There is thus obtained $(\pm)$-17α-allyl-8-azaoestr-4-en-17β-ol-3-one, M.P. 162–167° C.

Example 6

A solution of 0.49 part of $(\pm)$-17α-ethynyl-8-azaoestr-4-en-17β-ol-3-one in 15 parts of pyridine containing 0.15 part of 5% palladium on calcium carbonate is shaken in an atmosphere of hydrogen at atmospheric pressure and ambient temperature until the theoretical amount of hydrogen necessary for the conversion of the ethynyl radical into the vinyl radical is absorbed. The mixture is filtered, the pyridine is removed from the filtrate by evaporation under reduced pressure, and the residue is crystallised from petroleum ether (B.P. 60–80° C.). There is thus obtained $(\pm)$-17α-vinyl-8-azaoestr-4-en-17β-ol-3-one, M.P. 144–147° C.

Example 7

The process described in Example 1 is repeated except that the $(\pm)$-8-azaoestr-5(10)-en-17β-ol-3-one is replaced by the same weight of $(\pm)$-13-ethyl-8-azagona-5(10)-en-17β-ol-3-one (M.P. 56–64° C.; obtained as described in Example 6 of said U.S. application Serial No. 361,554). There is thus obtained (±)-13-ethyl-8-azagona-4-en-17β-ol-3-one, M.P. 133–141° C.

*Example 8*

The process described in Example 1 is repeated except that the (±)-8-azaoestr-5(10)-en-17β-ol-3-one is replaced by the same weight of (±)-13,17α-diethyl-8-azagona-5(10)-en-17β-ol-3-one (M.P. 140–145° C.; obtained as described in Example 7 of said U.S. application Serial No. 361,554). There is thus obtained (±)-13,17α - diethyl-8-azagona-4-en-17β-ol-3-one, M.P. 127–129° C.

*Example 9*

The process described in Example 1 is repeated except that the (±)-8-azaoestr-5(10)-en-17β-ol-3-one is replaced by the same weight of (±)-12-ethyl-17α-ethynyl-8-azagona-5(10)-en-17β-ol-3-one (obtained as described in Example 8 of said U.S. application Serial No. 361,554). There is thus obtained (±)-13-ethyl-17α-ethynyl-8-azagona-5-en-17β-ol-3-one, M.P. 199–203° C.

*Example 10*

The process described in Example 1 is repeated except that the (±)-8-azaoestr-5(10)-en-17β-ol-3-one is replaced by the same weight of (±)-13-n-propyl-8-azagona-5(10)-en-17β-ol-3-one (M.P. 129–135° C.; obtained as described in Example 9 of said U.S. application Serial No. 361,554). There is thus obtained (±)-13-n-propyl-8-azagona-4-en-17β-ol-3-one, M.P. 160–162° C.[crystallised from a mixture of light-petroleum (B.P. 80–100° C.) and benzene].

*Example 11*

The process described in Example 1 is repeated except that the (±)-8-azaoestr-5(10)-en-17β-ol-3-one is replaced by the same weight of (±)-17α-ethyl-13-n-propyl - 8-azagona-5(10)-en-17β-ol-3-one (obtained as described in Example 10 of said U.S. application Serial No. 361,554). There is thus obtained (±)-17α-ethyl-13-n-propyl-8-azagona-4-en-17β-ol-3-one, M.P. 153–156° C.

*Example 12*

The process described in Example 1 is repeated except that (±)-8-azaoestr-5-(10)-en-17β-ol-3-one is replaced by the same weight of (±)-17α-ethynyl-13-n-propyl-8-azagona - 5(10)-en-17β-ol-3-one (M.P. 185–186° C.; obtained as described in Example 11 in the specification of said U.S. application Serial No. 361,554). There is thus obtained (±)-17α-ethynyl-13-n-propyl-8-azagona-4-en-17β-ol-3-one, M.P. 163–165° C.

*Example 13*

5 parts of (±)-13,17α-diethyl-8-azagona-4-en-17β-ol-3-one, 5 parts of maize starch and 48 parts of lactose are intimately mixed and granulated with 10% maize starch paste. The granules are dried at a temperature not exceeding 50° C., and then mixed with 0.5 part of magnesium stearate and compressed into tablets each weighing 60 mg. There are thus obtained tablets suitable for oral administration for therapeutic purposes.

What I claim is:
1. A heterocyclic ketone of the formula:

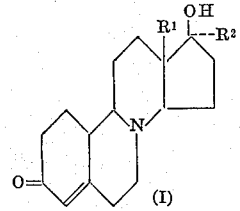

wherein $R^1$ stands for methyl, ethyl and n-propyl alkyl and $R^2$ stands for hydrogen, methyl, ethyl, n-propyl, ethynyl, vinyl or allyl, and the non toxic, acid addition salts thereof.

2. A compound as claimed in claim 1 which has the gonane configuration.

3. A compound selected from the group consisting of
(±)-8-azaoestr-4-en-17β-ol-3-one,
(±)-17-α-methyl-8-azaoestr-4-en-17β-ol-3-one,
(±)-17α-ethyl-8-azaoestr-4-en-17β-ol-3-one,
(±)-17α-ethynyl-8-azaoestr-4-en-17β-ol-3-one,
(±)-17α-allyl-8-azaoestr-4-en-17β-ol-3-one,
(±)-17α-vinyl-8-azaoestr-4-en-17β-ol-3-one,
(±)-13-ethyl-8-azagona-4-en-17β-ol-3-one,
(±)-13,17α-diethyl-8-azagona-4-en-17β-ol-3-one,
(±)-13-ethyl-17α-ethynyl-8-azagona-4-en-17β-ol-3-one,
(±)-13-n-propyl-8-azagona-4-en-17β-ol-3-one,
(±)-17α-ethyl-13-n-propyl-8-azagona-4-en-17β-ol-3-one and
(±)-17α-ethynyl-13-n-propyl-8-azagona-4-en-17β-ol-3-one,
and the non toxic acid addition salts thereof.

4. A salt as claimed in claim 3 selected from the group consisting of the hydrochlorides and oxalates of said compounds.

References Cited by the Examiner

Elderfield: "Heterocyclic Chemistry, vol. IV," Wiley, 1952, p. 282–4.

Fieser et al.: "Natural Products Related to Phenanthrene," Reinhold 1949, pp. 269, 328 and 463.r Imhoffen et al.: Ber. vol. 71, 1024–1028 (1938).

ALEX MAZEL, *Primary Examiner.*

HENRY R. JILES, *Examiner.*

DONALD G. DAUS, *Assistant Examiner.*